(12) United States Patent
Reiner et al.

(10) Patent No.: US 7,883,158 B2
(45) Date of Patent: Feb. 8, 2011

(54) HYDRAULIC UNIT FOR A HYDRAULIC VEHICLE BRAKE SYSTEM HAVING ANTI-SKID CONTROL

(75) Inventors: Juergen Reiner, Gestratz (DE); Rainer Schwarz, Immenstadt (DE); Andreas Weh, Sulzberg (DE); Tomoya Ideguchi, Immenstadt (DE); Dietmar Hofmann, Wertach (DE); Josef Hipp, Seeg (DE)

(73) Assignee: Robert Bosch GmbH, Stuttgart (DE)

( * ) Notice: Subject to any disclaimer, the term of this patent is extended or adjusted under 35 U.S.C. 154(b) by 70 days.

(21) Appl. No.: 12/067,967

(22) PCT Filed: Sep. 21, 2006

(86) PCT No.: PCT/EP2006/066574

§ 371 (c)(1),
(2), (4) Date: Mar. 25, 2008

(87) PCT Pub. No.: WO2007/039472

PCT Pub. Date: Apr. 12, 2007

(65) Prior Publication Data

US 2008/0251335 A1 Oct. 16, 2008

(30) Foreign Application Priority Data

Oct. 4, 2005 (DE) .................. 10 2005 047 357

(51) Int. Cl.
*F16B 17/00* (2006.01)

(52) U.S. Cl. ............................................. 303/116.4

(58) Field of Classification Search .................... 303/10, 303/11, 116.4, 119.2, 119.3; 417/273, 415, 417/440; 137/539
See application file for complete search history.

(56) References Cited

U.S. PATENT DOCUMENTS 5,651,433 A * 7/1997 Wirth et al. ............... 188/266.6
6,340,295 B1 * 1/2002 Hauser et al. ............... 417/470

FOREIGN PATENT DOCUMENTS

| DE | 44 41 976 A1 | 5/1996 |
|---|---|---|
| DE | 196 53 638 A1 | 6/1998 |
| JP | 11-48928 | 2/1999 |
| JP | 11-91527 | 4/1999 |
| JP | 2002-119013 | 4/2002 |
| WO | WO 94/27045 A1 | 11/1994 |
| WO | WO 01/39571 A1 | 6/2001 |

* cited by examiner

*Primary Examiner*—Christopher P Schwartz
(74) *Attorney, Agent, or Firm*—Ronald E. Greigg

(57) ABSTRACT

The invention relates to a hydraulic unit for a hydraulic vehicle brake system having anti-skid control. The hydraulic unit includes a hydraulic block and an electric motor for driving hydraulic pumps inside the hydraulic block. The hydraulic block and electric motor are joined at a circumferential joint. For connection, the invention provides that the electric motor is provided with a radial flange, which is overlapped by a surrounding bead of the hydraulic block. The bead is designed so that it overlaps, in a radial inward manner, the radial flange of the electric motor by a joining process, for example, a surrounding caulking. The electric motor is sealingly connected to the hydraulic block in a simple manner by the surrounding joining process.

19 Claims, 1 Drawing Sheet

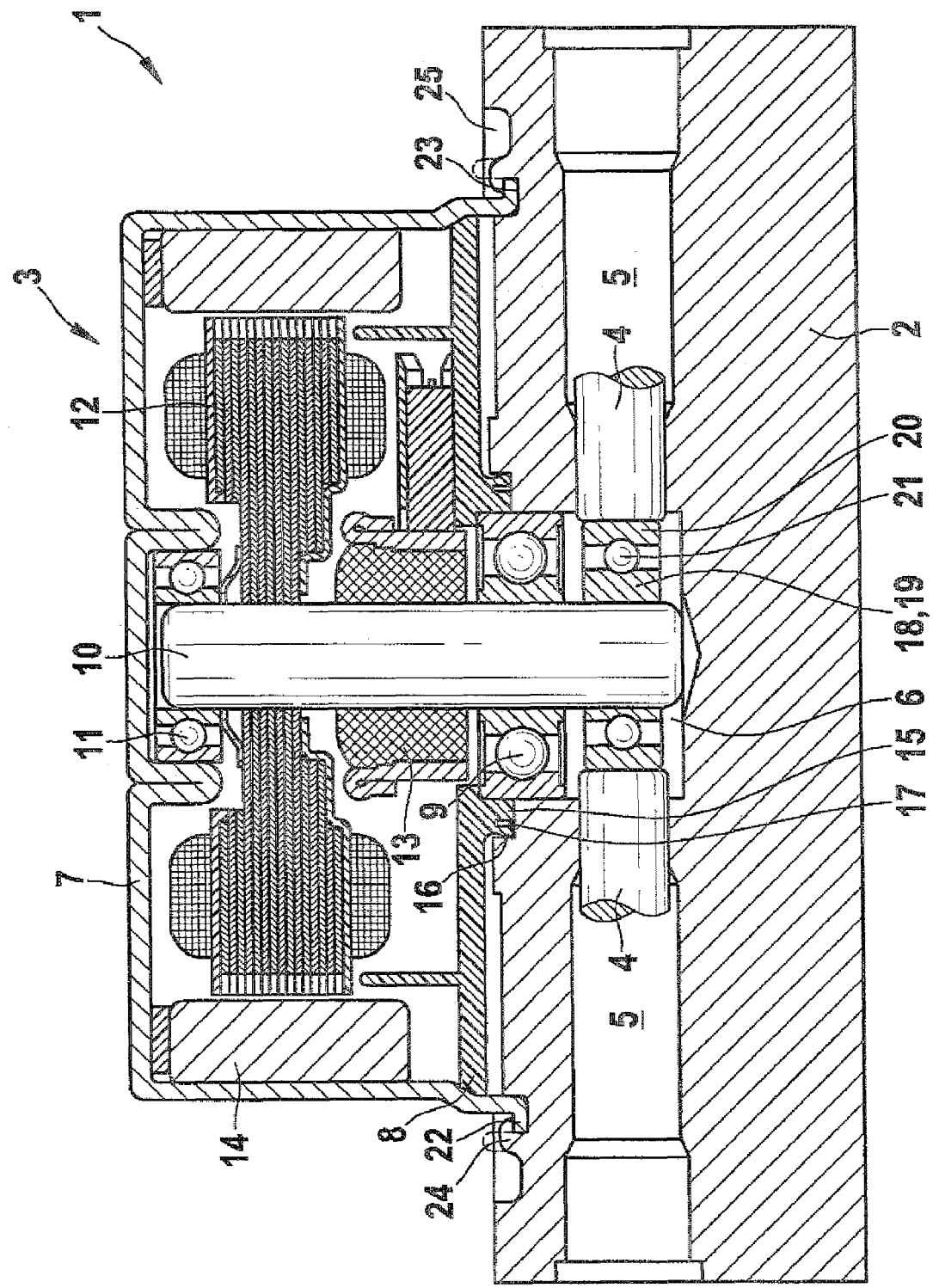

HYDRAULIC UNIT FOR A HYDRAULIC VEHICLE BRAKE SYSTEM HAVING ANTI-SKID CONTROL

CROSS-REFERENCE TO RELATED APPLICATION

This application is a 35 USC 371 application of PCT/EP 2006/066574 filed on Sep. 21, 2006.

BACKGROUND OF THE INVENTION

1. Field of the Invention

The invention relates to a hydraulic unit for a hydraulic vehicle brake system having a slip control.

2. Description of the Prior Art

Hydraulic units of this kind are intrinsically known. They have a hydraulic block to which an electric motor is mounted and secured with screws, with an end surface resting against a flat side of the hydraulic block. The electric motor serves to drive hydraulic pumps that are installed in the hydraulic block. The hydraulic block is usually a box-shaped metal component, generally composed of an aluminum alloy, in which bores are provided for the insertion of hydraulic components such as solenoid valves, hydraulic pumps, and hydraulic accumulators. Conduit lines let into the hydraulic block hydraulically interconnect hydraulic components inserted into the hydraulic block. With the hydraulic components, it is possible to provide a slip control, i.e. an antilock brake system, a traction control system, and/or an electronic stability program, also referred to as ABS, TCS, and ESP systems.

SUMMARY AND ADVANTAGES OF THE INVENTION

In the hydraulic unit according to the invention, the electric motor is attached to the hydraulic block by means of a revolving, shape-changing joining process. The joining process can, for example, be a caulking. The term "revolving" does not absolutely have to be understood to mean the working direction of the joining process, but can also refer to the fact that the completed joint extends over the entire circumference of the electric motor. Preferably, the joining of the electric motor to the hydraulic block produces a seal between the motor housing and the hydraulic block.

The invention has the advantage that it can be produced simply, quickly, and inexpensively and is suitable for automation and therefore mass production. The attachment according to the invention makes it possible to seal the electric motor against the hydraulic unit without sealing material. It also eliminates fasteners such as bolts or nuts and makes it unnecessary to cut threads inside the hydraulic block.

Advantageous embodiments and modifications of the invention will become apparent in the following detailed description and drawing.

BRIEF DESCRIPTION OF THE DRAWING

FIG. 1 shows a partially simplified axial section through a hydraulic unit according to the invention.

DESCRIPTION OF THE PREFERRED EMBODIMENT

The hydraulic unit 1 shown in the drawing has a hydraulic block 2 and an electric motor 3. The electric motor 3 is attached with one end surface to a flat side of the hydraulic block 2. The hydraulic block 2 is a flat, box-shaped body that is rectangular when viewed from above and is composed, for example, of an aluminum alloy. Two hydraulic pumps in the form of piston pumps and hydraulic components in the form of solenoid valves, hydraulic accumulators, and check valves that are not visible in the drawing are accommodated in the hydraulic block 2 and hydraulically connected to one another. The hydraulic unit 1 is used to provide slip control of a hydraulic vehicle brake system that is not otherwise shown. For the sake of simplicity, the only parts of the two hydraulic pumps—which are situated in a boxer arrangement inside the hydraulic block 2—that are shown in the drawing are the ends of pump pistons 4 and the stepped pump bores 5, which are let into the hydraulic block 2 in a coaxially arranged fashion. The pump bores 5 feed radially into a cam chamber 6, which is likewise embodied in the form of a stepped bore in the hydraulic block 2 and opens out onto the flat side of the hydraulic block 2 to which the electric motor 3 is attached. Hydraulic blocks 2 and hydraulic units 1 of this kind are intrinsically known and therefore need not be explained in greater detail at this point.

The electric motor 3 has a cup-shaped motor housing 7, whose open end surface is closed by a perforated disk-shaped housing cover 8. The housing cover 8 constitutes an end plate for a motor bearing 9. This motor bearing 9, which is situated in the housing cover 8 serving as the bearing end plate, cooperates with an additional motor bearing 11 on an end wall of the motor housing 7 to support a motor shaft 10 in rotary fashion. A rotor 12 and a commutator 13 are mounted on the motor shaft 10. A stator 14 is accommodated inside the motor housing 7.

The motor bearing 9 installed in the housing cover 8 protrudes axially from the housing cover 8 and engages in the cam chamber 6 of the hydraulic block 2. In this way, the electric motor 3 is centered in the cam chamber 6 of the hydraulic block 2.

The housing cover 8 of the electric motor 3 is equipped with an axial collar 15, which concentrically surrounds the motor bearing 9. The axial collar 15 of the electric motor 3 engages in an annular step in the hydraulic block 2 at which the mouth of the cam chamber 6 oriented toward the electric motor 3 widens out. For sealing purposes, the axial collar 15 is provided with a circumferential bead 16 that protrudes radially outward and rests in a sealed fashion against a circumferential wall of the annular step at the mouth of the cam chamber 6 in which the axial collar 15 engages. A slit-like circumferential groove 17 is let into an end surface of the axial collar 15, lending radial resilience to the outer region of the axial collar 15 provided with the circumferential bead 16. The bead 16 rests resiliently against the circumference wall of the annular step in a prestressed fashion.

The motor shaft 10 protrudes into the vicinity of a bottom surface in the cam chamber 6. Press-fitted onto the end of it is a cam 18, which is embodied in the form of a radial ball bearing, with an inner ring 19 and an outer ring 20 between which bearing balls 21 roll. To produce an eccentricity, a hole of the inner ring 19—with which the inner ring 19 is press-fitted onto the motor shaft 10—has an eccentricity in relation to the outer circumference of the inner ring 19. In the drawing, the eccentricity of the inner ring 19 of the cam 18 can be seen in the unequal thickness on the left and right sides of the motor shaft 10. Upon rotation of the motor shaft 10 and the inner ring 19, the outer ring 20 of the cam 18 moves on an imaginary circular path around an imaginary rotation axis of the motor shaft 10, without rotating. As a result, the pump pistons 4 of the otherwise not shown hydraulic pumps are driven into a reciprocating stroke motion in the pump bores 5.

On the end surface that is closed by the housing cover 8, an edge of the motor housing 7 is reshaped to form an outwardly protruding radial flange 22. The radial flange 22 fits in a precisely-fitting fashion into a circular groove 23 of the hydraulic block 2. The groove 23 is let into the flat side of the hydraulic block 2 to which the electric motor 3 is attached. The groove 23 in the exemplary embodiment has a rectangular cross section and encloses the cam chamber 6 concentrically. An uninterrupted circumferential bead 24 is provided on an outer edge of the groove 23 and is reshaped, e.g. caulked, in a radially inward direction to overlap the radial flange 22 of the electric motor 3. Before the caulking, the bead 24 has the shape depicted with dashed lines. The caulking of the bead 24 can be performed, for example, by means of a revolving tool that is not shown. The caulking of the bead 24 is a shape-changing joining process by which the electric motor 3 is attached to the hydraulic block 2. By means of the joining process, the electric motor 3 is sealed against the hydraulic block 2 without additional sealing material. The seal is produced through contact of the radial flange 22 of the motor housing 7 against a base of the groove 23 of the hydraulic block 2 on the outer and/or inner circumference of the radial flange 22, which rests in a sealed fashion externally and/or internally against circumference surfaces of the groove 23, and also by means of the bead 24 of the hydraulic block 2, which has been reshaped in a radially inward direction, rests against the radial flange 22 of the motor housing 7, and presses the radial flange 22 of the motor housing 7 against the bottom of the groove 23 of the hydraulic block 2. The groove 23 represents a countersink in the hydraulic block 2 in which the radial flange 22 of the motor housing 7 rests in a precisely-fitting fashion.

Immediately adjoining the bead 24 on the outside, the hydraulic block 2 has another groove 25. This groove 25 extends in a circumferential fashion and encompasses the bead 24. It prevents the formation of shavings or some other form of material removal from the hydraulic block 2 during the caulking of the bead 24. This prevents particles of material from getting between the electric motor 3 and the hydraulic block 2 or getting into some other part of the hydraulic unit 1 as the electric motor 3 is being attached to the hydraulic block 2.

The foregoing relates to the preferred exemplary embodiment of the invention, it being understood that other variants and embodiments thereof are possible within the spirit and scope of the invention, the latter being defined by the appended claims.

The invention claimed is:

1. A hydraulic unit for a hydraulic vehicle brake system equipped with a slip control, comprising:
   a hydraulic block containing a hydraulic pump;
   an electric motor for driving the hydraulic pump attached to the hydraulic block, the electric motor being situated with an end surface against a flat side of the hydraulic block; and
   a joint between the hydraulic block and the electric motor, wherein the joint has a first shape before a shape-changing joining process and has a second shape after the shape-changing joining process, which results in a completed joint having the second shape which extends completely around the end surface of the electric motor, wherein the joining process seals the end surface of the electric motor against the hydraulic block without additional sealing material.

2. The hydraulic unit according to claim 1, wherein the electric motor has an axial collar, which is situated inside the joint between the hydraulic block and the electric motor, the collar being engaged in a sealed fashion with a countersink in the hydraulic block.

3. The hydraulic unit according to claim 2, wherein the axial collar is resilient in a radial direction and rests against a circumference surface of the countersink of the hydraulic block in a radially prestressed fashion.

4. The hydraulic unit according to claim 3, wherein the axial collar has an axial groove that produces radial resilience of the axial collar.

5. The hydraulic unit according to claim 1, wherein the electric motor has a circumferential radial flange on its end surface and the flat side of the hydraulic block has a circumferential, bead-like raised area, which area is reshaped from the first shape in a radially inward direction to the second shape so that it overlaps the radial flange of the electric motor.

6. The hydraulic unit according to claim 5, wherein the hydraulic block has a circumferential groove encompassing the circumferential, bead-like raised area.

7. The hydraulic unit according to claim 5, wherein the hydraulic block has a precisely-fitting countersink for the electric motor and sealing is produced through contact of the radial flange against a base of the countersink on the outer and/or inner circumference of the radial flange which rests in a sealed fashion externally and/or internally against circumference surfaces of the countersink, and by the reshaped bead-like raised area.

8. The hydraulic unit according to claim 1, wherein the hydraulic block has a precisely-fitting countersink for the electric motor.

9. A hydraulic unit for a hydraulic vehicle brake system equipped with a slip control, comprising:
   a hydraulic block containing a hydraulic pump;
   an electric motor for driving the hydraulic pump attached to the hydraulic block, the electric motor being situated with an end surface against a flat side of the hydraulic block;
   a joint between the hydraulic block and the electric motor, wherein the joint has a first shape before a shape-changing joining process and has a second shape after the shape-changing joining process, which results in a completed joint having the second shape which extends completely around the electric motor; and
   the electric motor having an axial collar, which is situated inside the joint between the hydraulic block and the electric motor, the collar being engaged in a sealed fashion with a countersink in the hydraulic block.

10. The hydraulic unit according to claim 9, wherein the hydraulic block has a cam chamber embodied as a stepped bore in the hydraulic block.

11. The hydraulic unit according to claim 10, wherein a motor shaft protrudes into vicinity of a bottom surface in the cam chamber.

12. The hydraulic unit according to claim 11, wherein a cam embodied in the form of a radial ball bearing is press-fitted onto an end of the motor shaft in a vicinity of a bottom surface in the cam chamber.

13. The hydraulic unit according to claim 12, wherein the radial ball bearing comprises an inner ring and an outer ring between which bearing balls roll, the inner ring being press-fitted onto the end of the motor shaft.

14. The hydraulic unit according to claim 13, wherein an inner circumference of the inner ring has an eccentricity in relation to an outer circumference of the inner ring.

15. The hydraulic unit according to claim 10, wherein the countersink is an annular step in the hydraulic block at a mouth of the cam chamber oriented toward the electric motor.

16. The hydraulic unit according to claim 15, wherein the axial collar has a circumferential bead protruding radially outward and rests in a sealed fashion against a circumferential wall of the annular step.

17. The hydraulic unit according to claim 9, wherein the axial collar is resilient in a radial direction and rests against a circumference surface of the countersink of the hydraulic block in a radially prestressed fashion.

18. The hydraulic unit according to claim 17, wherein the axial collar has an axial groove that produces radial resilience of the axial collar.

19. The hydraulic unit according to claim 18, wherein the axial groove is a circumferential slit in an end surface of the axial collar.

* * * * *